July 9, 1968 A. I. ROMAN 3,392,276
ELECTRICALLY ILLUMINATED JEWELRY
Filed April 19, 1966

INVENTOR.
Alfred I. Roman

United States Patent Office 3,392,276
Patented July 9, 1968

3,392,276
ELECTRICALLY ILLUMINATED JEWELRY
Alfred I. Roman, New Haven, Conn.
(1700 California Ave. SW., Seattle, Wash. 98116)
Filed Apr. 19, 1966, Ser. No. 545,791
1 Claim. (Cl. 240—6.46)

ABSTRACT OF THE DISCLOSURE

The present invention relates to a novel finger ring with a tiny electric lamp in place of a diamond or other precious stone, an electric battery contained within the ring to provide the lamp with electric current and a switching means to permit connecting the battery to the lamp, or opening the circuit, thereby flashing the lamp on and off.

---

The present invention relates to novelty jewely, and more specifically, to jewelry illuminated by tiny electric lamps.

One of the objects of this invention is to provide a novel finger ring with a tiny electric lamp in place of a diamond or other precious stone, and an electric cell or battery, contained within the ring, to provide the lamp with electric current.

Another object of this invention is to provide a novel finger ring with an electric lamp and an electric battery and a switching means that permits connecting the battery to the electric lamp, to illuminate the lamp.

Another object of this invention is to provide a novel finger ring with an electric lamp and an electric battery and a switching means that permits rapid connecting and disconnecting of the electric battery and the electric lamp to flash the lamp for signalling.

Another object of this invention is to provide a novel earring with an electric lamp an an electric battery and a switching means that permits connecting the battery to the electric lamp to illuminate the lamp.

Another object of this invention is to provide a novel earring with an electric battery and an electric lamp and an automatic switching means operated by the motion of the wearer, to connect and disconnect the electric battery and the electric lamp, to cause the lamp to flash on and off, thus giving a twinkling effect.

Another object of this invention is to provide a novel tie clasp with an electric lamp and an electric battery and a switching means that permits connecting the electric battery to the electric lamp, to illuminate the lamp.

A further object of this invention is to provide novel cuff links with an electric lamp and an electric battery and a switching means that permits connecting the electric battery to the electric lamp to illuminate the lamp.

A still further object of this invention is to provide a novel tiara with one or more electric lamps, an electric battery and a switching means that permits connecting the electric battery to the electric lamps to illuminate the lamps.

Other objects and novel features of my invention will become apparent from the following detailed description and accompanying drawings in which.

The novel electrically illuminated finger ring consists of the body 10, which may be made of plastic, wood, metal or any other suitable material. As the switching means shown in the figure is for a ring fabricated from an insulating material, the describtion following applies to this type of ring. The only modification required for a metal ring, however, is insulating the contact spring of the switching means from the ring.

Figure 2:
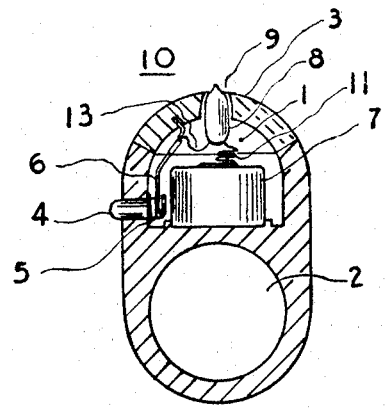
FIGURE 2 is a horizontal section of the finger ring on the line 2—2 of FIGURE 1.
Figures 1, 3:
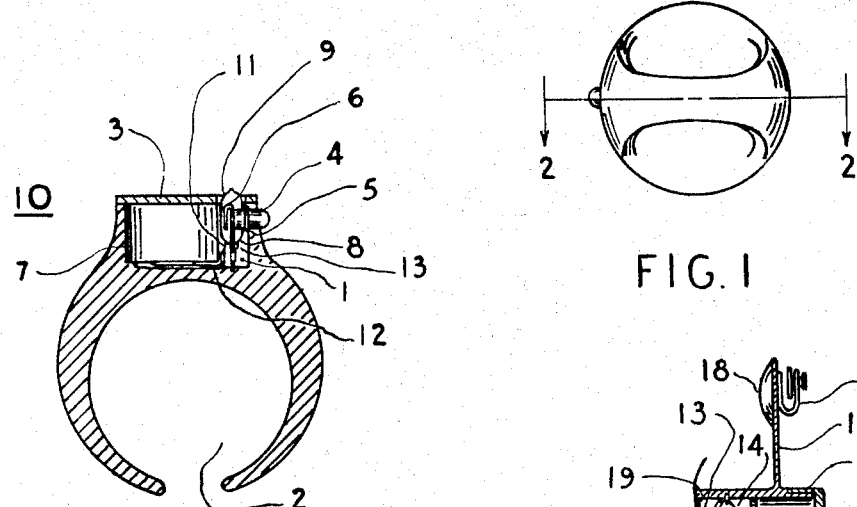
FIGURE 1 is a rear view of a finger ring with electric lamp, self-contained electric battery and switching means, according to this invention.
FIGURE 3 is a horizontal section of a finger ring of different shape from that shown in FIGURES 1 and 2, and with a different arrangement of electric lamp and electric battery, that permits their containment in a smaller compartment.

Opening 2 is for insertion of a finger. Cap 3 provides access to compartment 1 for assembly and may be secured to the body of the ring by bonding or any other suitable means. For metal rings, cap 3 may be secured to the body of the ring by soldering, brazing, welding, riveting, or any other suitable means. Cylinder 4 is provided with a shoulder or ring 5, to limit its outward travel. Spring 6, which is made of a suitable electrically conducting material, is secured at one end to cap 3, in FIGURE 2, and to the body of the ring in FIGURE 3. An electric cell or battery 7 is provided to supply electric current to lamp 8, the tip of which may extend through the opening 9 in cap 3, or a window may be provided in said opening, to seal the compartment 1. Lead 11 from lamp 8 may be coiled so as to abut one terminal of battery 7, or a spring 12 of good electrical conducting material may be inserted between lead 11 and said terminal, and lead 11 may then be secured to spring 12 so as to make good electrical contact with it. A second lead 13, from lamp 8, is secured to spring 6, so as to make good electrical contact with it. Although the form of securement in the figure is a bent flap which is a part of spring 6, I do not limit myself to this form, but may employ any other convenient means of securment.

The switching means may be operated by pressing cylinder 4 so as to deflect spring 6 and cause the spring to make electrical contact with at battery 7 by abutting the adjacent side of the battery, thus completing the electric circuit and causing lamp 8 to light. When cylinder 4 is released, spring 6 will return to its normal position, breaking the electric circuit and extinguishing lamp 8. A locking means also may be provided to hold spring 6 in contact with battery 7, to give a steady light.

Figure 4:
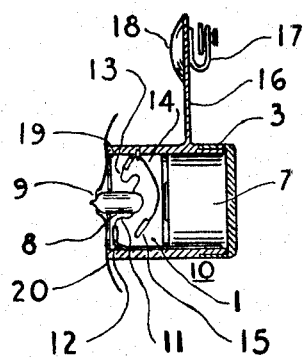
FIGURE 4 is a vertical section of an earring with electric lamp and self-contained electric battery and a switching means operated by the motion of the wearer.

The electrically illuminated earring shown in FIGURE 4 is similar in principle to that of the ring previously described, with the addition of an automatic switching means operated by the motion of the wearer, to automatically open and close the electric circuit, causing the lamp to flash off and on, thus giving a twinkling effect. The switching means comprises the arm 14 made of thin sheet metal or metallic foil, and weight 15 secured to arm 14 by any suitable means. Arm 14 is pivotally suspended from body 10 by a staple or any other suitable means. Lead 13 is secured to the end of arm 14 near the pivot, by means of a bent flap, which is a part of arm 14, or by any other suitable means. When arm 14 is swung by the motion of the wearer of the earring, it will abut one terminal of battery 7 for short intervals, making contact with it, and subsequently swing away from the terminal, breaking the contact, thus causing lamp 8 to flash. Member 16 suspends body 10 from ear clasp 17, which is secured to cover 18. Petals 20, which simulate flower petals, are for decorative effect and are not required for the functioning of this device, and the earring may be made in any other artistic or novel from without departing from this invention. Ring 19, which is secured to the petals 20, serves as a mounting means for body 10. A locking means also may be provided to hold the electric circuit in the closed position to give a steady light.

Figure 5:
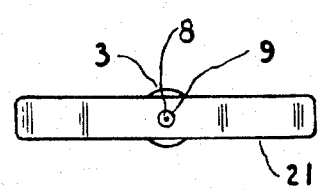
FIGURE 5 is a front view of a tie clasp with electric lamp, self-contained electric battery and switching means.

The electrically illuminated tie clip shown in FIGURE 5 is similar in principle to the rings previously described and has the bar 21, for gripping the tie. Bar 21 is secured to the container of the electric battery, electric lamp and switching means.

An electrically illuminated tie pin or stick pin may be made by securing a tie or stick pin to a container for an electric battery, electric lamp and switching means similar to that of FIGURE 5.

Electrically illuminated cuff links also may be made by securing the previously described container for an electric battery, electric lamp and electric switching means to a linkage means for fastening to the cuffs of a shirt.

An electrically illuminated tiara may be made by securing a similar container to a tiara provided with at least one electric lamp as a substitute for jewels.

Although only a single lamp and a single battery are shown in the figures, I do not limit myself to this number but any number or combination thereof may be employed in various types of arrangement.

The accompanying drawings illustrate the preferred form of this invention, although it is to be understood that the invention is not limited to the exact details of construction shown and described, but is susceptible to various modifications and adaptations as will be apparent to those skilled in the art without departing from the scope of the invention as stated in the following claim.

I claim:
1. An electrically illuminated finger ring comprising a ring body adapted to fit on a finger and provided with a hollow compartment, an electric cell or battery and an electric lamp contained in said compartment, switching means for electrically connecting or disconnecting the lamp and the battery, and an opening in said compartment for the lamp to permit the light from the lamp to be seen, said switching means comprising a push button slidably mounted axially of its length in the ring body to have an outer end exposed external of the ring and to have an inner end projecting into the compartment adjacent the battery, an electrically conductive spring finger in the compartment anchored at one end to the wall of the compartment and having its other end projecting to engage the inner end of the button and urge the button outwardly, stop means on the button to limit outward movement thereof, said spring finger and battery being electrically connected to the bulb in a normally open circuit closed by manually pressing said button inwardly to yieldingly urge the spring finger against the battery.

References Cited

UNITED STATES PATENTS

| | | | |
|---|---|---|---|
| 1,754,570 | 4/1930 | Pickett | 240—59 |
| 1,981,213 | 11/1934 | Zwierzynski | 240—10.66 |
| 2,128,899 | 9/1938 | Barnhart | 240—6.4 |
| 2,374,375 | 4/1945 | O'Donnell | 240—6.4 |
| 2,516,180 | 7/1950 | Brown | 240—6.4 |
| 2,534,179 | 12/1950 | Peterson et al. | 240—6.45 |
| 2,798,148 | 7/1957 | Di Lizio et al. | 240—6.4 |
| 2,854,563 | 9/1958 | Catching | 240—6.4 |

FOREIGN PATENTS 1,057,194   10/1953   France.

NORTON ANSHER, Primary Examiner.

J. W. PRICE, Assistant Examiner.